United States Patent [19]

Ewert et al.

[11] Patent Number: 5,166,936
[45] Date of Patent: Nov. 24, 1992

[54] AUTOMATIC HARD DISK BAD SECTOR REMAPPING

[75] Inventors: Richard A. Ewert, Cypress; Stephen M. Schultz, Houston, both of Tex.

[73] Assignee: Compaq Computer Corporation, Houston, Tex.

[21] Appl. No.: 556,340

[22] Filed: Jul. 20, 1990

[51] Int. Cl.[5] .............................................. G11C 29/00
[52] U.S. Cl. .................................. 371/21.6; 371/21.2; 371/21.1
[58] Field of Search ..................... 371/21.6, 21.2, 21.1, 371/10.1, 11.1; 364/285.3

[56] References Cited

U.S. PATENT DOCUMENTS

| | | | |
|---|---|---|---|
| 4,506,362 | 3/1985 | Morley | 371/13 |
| 4,527,251 | 7/1985 | Nibby, Jr. et al. | 364/900 |
| 4,802,117 | 1/1989 | Chrosny et al. | 364/900 |
| 4,943,966 | 4/1990 | Giunta et al. | 371/11.1 |

OTHER PUBLICATIONS

Peter Norton, *The Norton Trouble-Shooting Guide for Disks*, (A Supplement to the Norton Utilities Advanced Edition A.S), 1988 Peter Norton Computing, Inc. pp. 1–15, 63–70, 116–118, 130–135.

Description of Conner Peripherals, Inc. Hard disk drive sector format command, Jul. 31, 1989, Compaq Computer Corp.

American National Standards Institute, Global Engineering Documents, "Small Computer System Interface –", Mar. 9, 1990 version, X3.131-198 x, pp. 8-34 to 8-36.

D. Patterson, G. Gibson, R. Katz, "A Case for Redundant Arrays of Inexpensive Disks (RAID)," Dec. 1987, Report No. UCB/CSD 87/391, University of Berkeley.

D. Patterson, P. Cehn, G. Gibson, R. Katz, "Introduction to Redundant Arrays of Inexpensive Disks (RAID)," Dec., 1988, Report No. UCB/CSD 88/479, University of California Berkeley.

M. Schulze, "Considerations on the design of a RAID Prototype," Aug., 1988, Report No. UCBF/CSD 88/448, University of California Berkeley.

*Primary Examiner*—Robert W. Beausoliel
*Assistant Examiner*—Ly V. Hua
*Attorney, Agent, or Firm*—Pravel, Gambrell, Hewitt, Kimball & Krieger

[57] ABSTRACT

A method for automatically remapping a disk after receiving a bad sector indication without requiring system operator intervention, initiation of a diagnostic program or system down time. When the disk controller receives the error and mirroring or parity operation is activated, a remap routine is initiated. The routine finds the bad sector in the request, builds a good track of data and stores this good track of data in a reserved area on all the disk units on the controller. The data in the reserved area is then read, and if successful, the track having the bad sector is remapped to remove the bad sector from use. The saved data is then rewritten to the track, thus restoring the disk unit to full operation. A flag is set during the process so that should power fail the process can be restarted.

8 Claims, 11 Drawing Sheets

AUTOMATIC HARD DISK BAD SECTOR REMAPPING

BACKGROUND OF THE INVENTION

1. Field of the Invention

The present invention relates to disk controller systems designed for use in computer systems, and more particularly, to disk controllers which have the capability of resolving bad sectors.

2. Description of the Related Art

Computer systems are becoming much more powerful. While personal computers previously were sufficiently low power and thus low cost that they could be easily be justified for single users, many of the more powerful or high end systems which are available today are quite expensive and very powerful, so that they are used primarily for multiple user or network environments. With the transfer of functions from mainframe computers to the multiuser or network systems, it has become more critical that the multiuser computer or file server in the network not be removed from service for an extended period of time as this reduces overall system productivity. Therefore, it has become critical that as many errors as possible be fixed without requiring the system to be shut down or removed from active service.

One element in common in all of the more powerful systems is the increased amount of hard disk space being used or required. As more users are added and more complex applications are developed, ever larger amounts of hard disk storage are added to the system. To help handle these large disk units, or disk arrays as they are called in certain cases, intelligent disk controllers were and are being developed so that much of the control processing can be off loaded from the central processor in the system. Because of this shift in functions, the central processor is not required to perform numerous functions and more overhead is available for primary functions. This allows increases in overall system performance and throughput.

Because of the larger amounts of disk space being utilized and the relatively high failure rates of the disk units, some technique for protection of the data is generally utilized. The simplest form of this protection is called mirroring, where two disk units are utilized for each given data element, with identical data being stored on both units in parallel. In this manner, if one unit fails, the data can be obtained from the other unit without the interruption of service. However, when the bad drive does need to be replaced, or at least the errors permanently corrected or resolved, conventionally this has required that the system not be accessible to system users, so that these system activities can be performed. The system operator must run certain diagnostic software which requires exclusive system control. So in addition to the loss of system, operator actions are required.

The alternative to mirroring, and a more complex design, is called parity using a disk array and is generally described in articles written by D. Patterson, et al., *A Case for Redundant Arrays of Inexpensive Disks (RAID)*, ACM SIGMOD conference, Jun. 1-3, 1988; D. Patterson, et al., *Introduction to Redundant Arrays of Inexpensive Disks (RAID)*, Report No. UCB/CSD 88/479, University of California Berkeley, December, 1988; and M. Schulze, *Considerations on the Design of a RAID Prototype*, Report No. UCB/CSD 88/448, University of California Berkley, August, 1988. The drive array configuration allows storage of redundant data, called parity data, so that errors can temporarily be corrected without data loss, but once again for the error to be more permanently resolved it requires full and unhindered access to the network or system and operator action.

One common failure of a disk unit is that a sector on a single track goes bad. A bad sector is one that does not reliably accept or provide data, generally due to a basic disk media failure. Present disk units typically provide a spare sector per track to allow a simple remapping without losing a significant amount of disk space or speed because of alternative location seeks. The controller contained in the disk unit itself contains sufficient software and capabilities so that when given a remap or reformat command the controller reformats the particular track, changing the sector locations so that bad sectors are mapped out of the track and the spare utilized. However, this conventionally requires the use of a special diagnostic program to provide the remap or reformat commands to the disk unit, which of course requires that the system be removed from normal use for a period of time.

Therefore, should a disk unit fail for some reason, particularly a single sector going bad, while mirroring or parity assures that the data will not automatically be lost, in use the system must be removed from its normal activities and placed in a diagnostic mode by the operator to allow the bad disk unit to corrected, thus decreasing overall system efficiency.

SUMMARY OF THE INVENTION

The present invention is a method for allowing automatic remapping or reformatting of bad sectors without requiring the computer system to removed from normal operations or operator intervention. Software contained in an intelligent disk controller senses when an error occurs while reading or writing data. The controller then proceeds to breakdown the request to the individual tracks and sectors and finds the particular sector or sectors which are bad and the basis for the error. The data on the entire track is stored in a reserved area, preferably on each disk unit in the system. The data associated with the bad sector is developed from the mirror or parity drive and written to this reserved area so that a complete track of accurate data is present.

The controller then attempts to read the data which has been written to the reserved areas to make sure that the data will be available and will not be permanently lost. If the read operation is successful, a reformat or remap command is presented to the disk units for the particular track that has developed the bad sector. After the reformat is completed, the data is retrieved from the reserved areas and rewritten to the track of interest. Because of the reformatting capabilities of the disk unit, this causes the data to be rewritten onto the remapped and now valid track.

Because this error detection and remapping process is being performed by the disk controller completely transparent to any operation on the system, the system is not required to be stopped or brought down from normal service and no operator action is necessary, so there is no loss of system availability.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
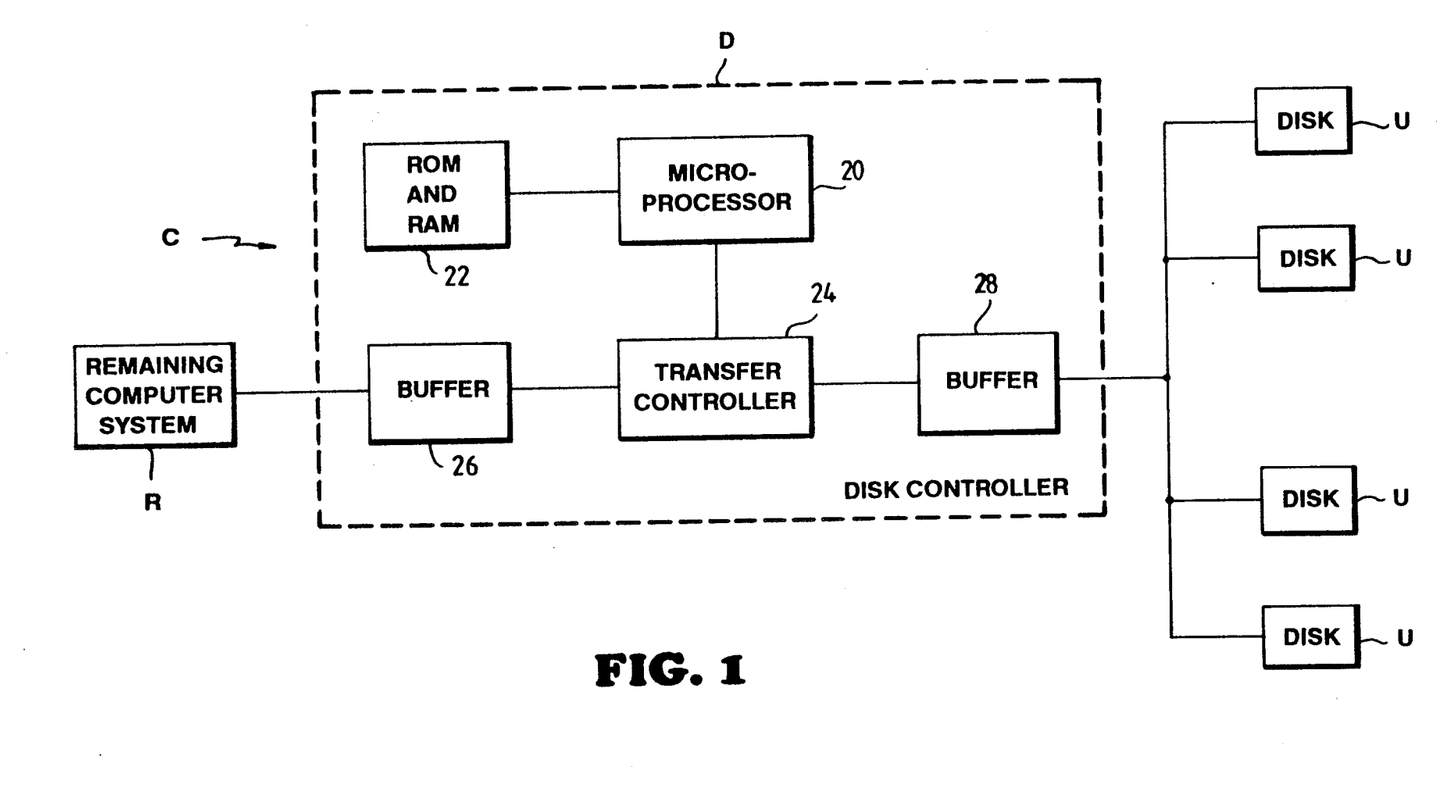
FIG. 1 is a block diagram of a disk controller and computer system incorporating the present invention.

A computer system, generally referred to by the letter C, including the disk operations of the present invention, is shown in FIG. 1. A disk controller D is connected to the remaining portions R of the computer system C in such a manner that commands can be transferred between the remaining portions R and the disk controller D. The remaining portions R of the computer system C include, for example, the processor, the memory, the video system, other input/output functions, a keyboard, and so on as commonly used in computer systems. In the preferred embodiment the connection between the disk controller D and the remaining portions R is developed by having the disk controller D formed as a circuit board which is placed into an interchangeable slot in the computer system C, but in alternate embodiments the disk controller D can be an external unit or located in other manners.

The disk controller D includes a microprocessor 20 which is connected to read only memory (ROM) and random access memory (RAM) 22, this ROM and RAM providing the operating instructions and temporary memory used by the microprocessor 20 which controls the operations of the disk controller D. The microprocessor 20 is coupled to a transfer controller 24 which performs the actual transfer of data between the remaining portions R and an array of disk units U. The transfer controller 24 is connected to the remaining portions R by means of a buffer 26 and the transfer controller 24 is connected to the various disk units U by a buffer 28. More detail on the actual design of a suitable disk controller is provided in copending patent application Ser. No. 431,735, entitled "Disk Array Controller With Parity Capabilities", filed Nov. 3, 1989 and assigned to the same assignee as this invention.

In the preferred embodiment the disk units U can be configured to operate as mirrors or in a parity organization. In either event redundant data for each sector is stored on the assembly of disk units U. These implementations are developed by the disk controller D based on the instruction sequences contained in the ROM 22 of the microprocessor 20 and configuration information sorted in the disk controller D and on the disk units U.

Figure 10:
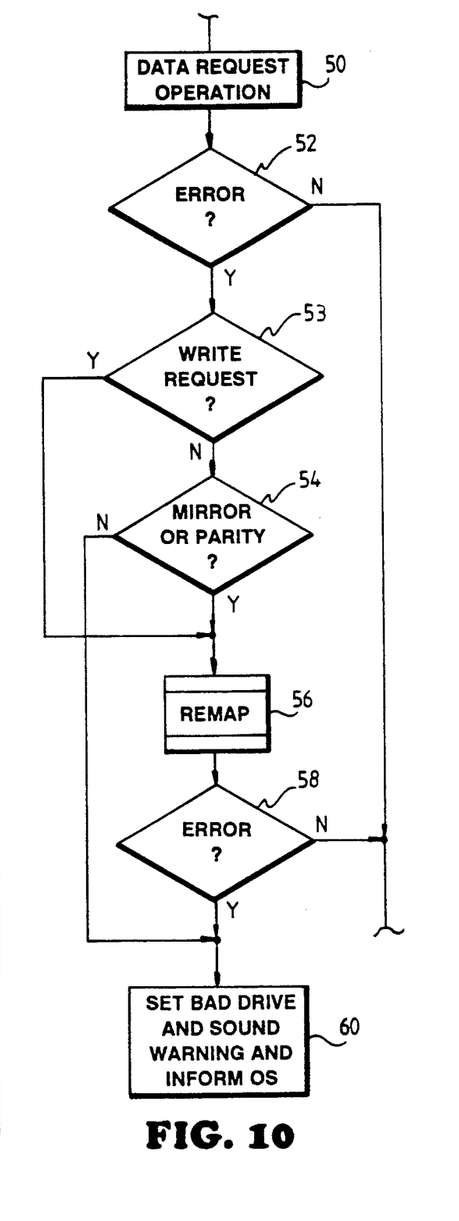

The computer system C generally transmits a data request, in a preferred example either a read or write request, to the disk controller D through the buffer 26 and the transfer controller 24. The microprocessor 20 acknowledges this data request and instructs the transfer controller 24 to initiate the operation at step 50 (FIG. 10). The operation is performed by the disk units U, but for purposes of describing this invention an error is returned because a sector on a particular track in a disk unit U being accessed has become bad. The microprocessor 20 receives this error message in step 52. In step 53 the microprocessor 20 determines if the requested operation was a write request. If so, control proceeds to step 56. If the operation was a read request, control proceeds to step 54 to determine if the disk units U are in a mirror or parity configuration. If so, control proceeds to step 56, where the REMAP sequence 100 (FIG. 2A) is initiated. Control proceeds to step 58 to determine if an error was returned by REMAP sequence 100. If not, control proceeds to steps which complete the task the microprocessor 20 was performing prior to the read error. If an error did occur in step 48 or the disk units U were not in a mirror or parity configuration, control proceeds to step 60. In step 60 the drive is indicated as being bad in a reserved area on each of the disk units U, an audible warning is sounded and a drive failure message is provided to the operating system of the computer system C. It is noted that if the remap operation can and is successfully performed, no interruption of operation or service is required to have a diagnostic program execute. Conventionally this error might have been ignored by the disk controller or passed to the operating system of the computer system, which in many cases would ignore the error if valid data could be obtained and might place an entry in a log file, allowing the error to go undetected for an extended period. In some cases the operating system might indicate the error and disable mirroring but error resolution was still left to the system operator.

Figure 2A:
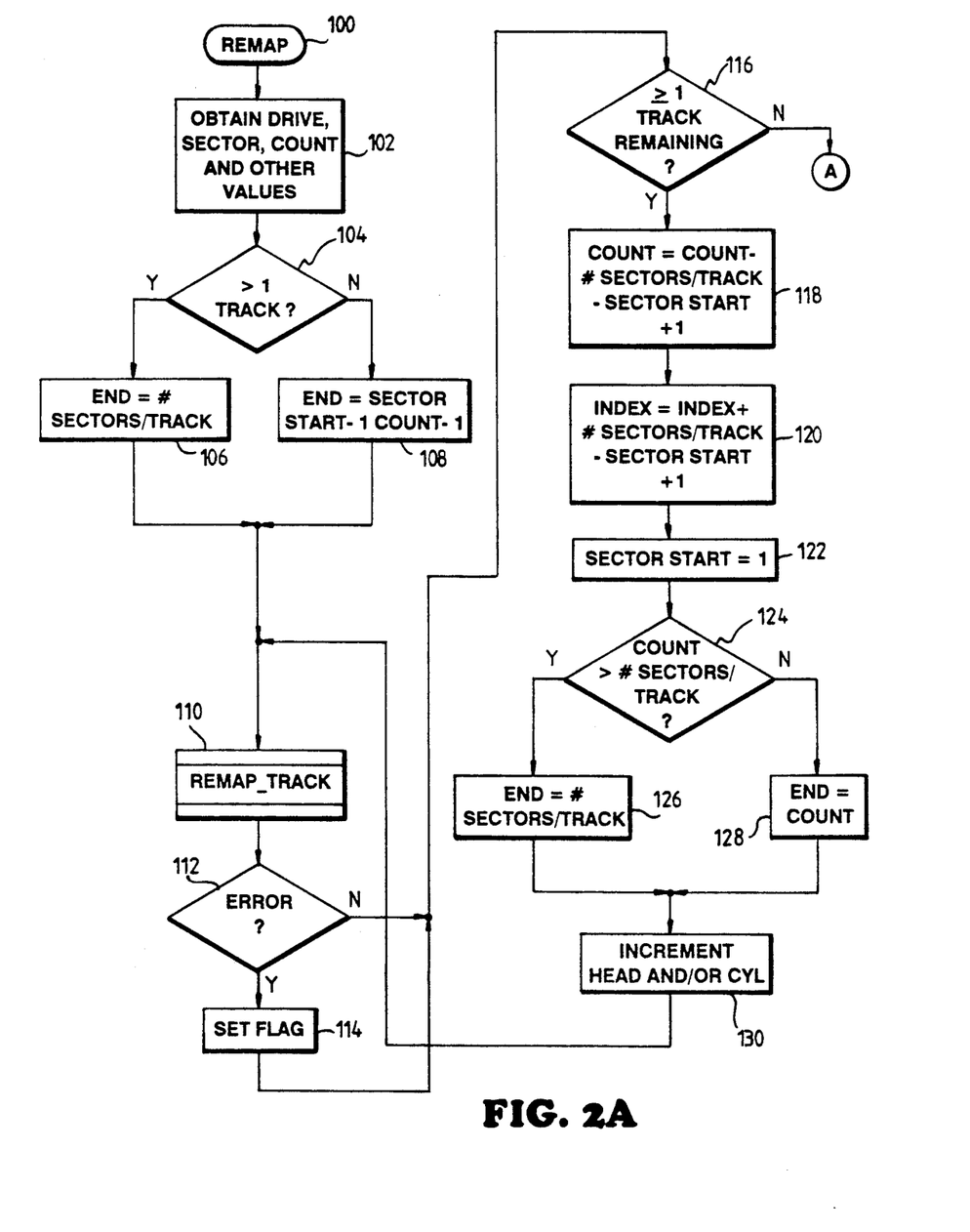
FIGS. 2A, 2B, 3A, 3B, 3C, 4A, 4B, and 5–10 are flowchart illustrations of operating sequences according to the present invention.
Figure 3A:
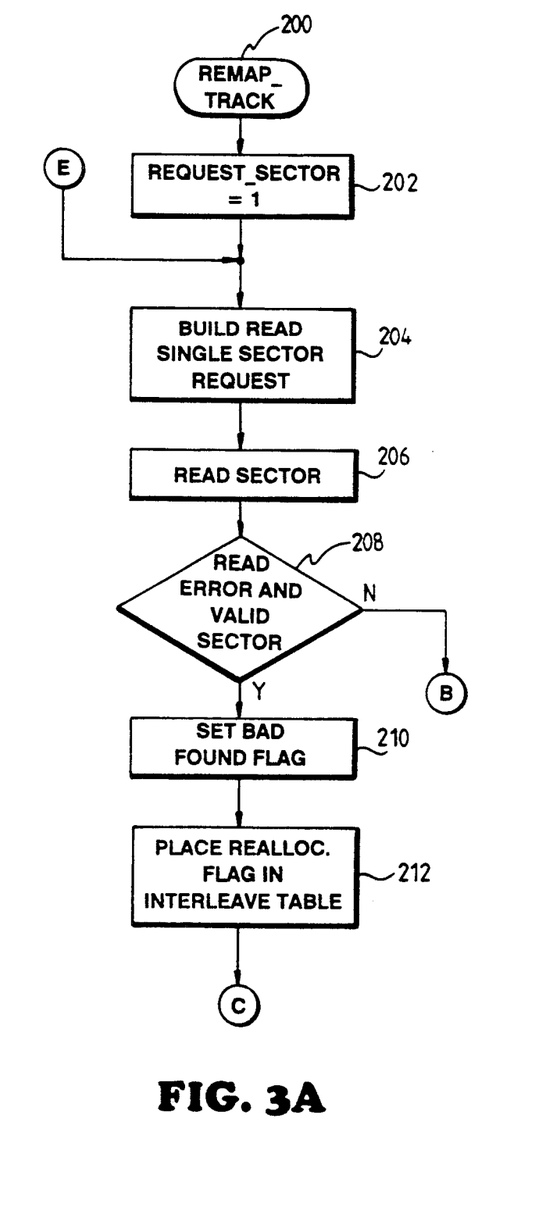

The REMAP sequence 100, as stated, is initiated when an error is acknowledged by the microprocessor 20 and is a possible indication that a sector on a disk unit U is bad. The REMAP sequence 100 commences at step 102 by obtaining the drive, sector, sector transfer count and other values that were provided by the read request from the computer system C in which the microprocessor 20 received the error. Control proceeds to step 104 where the microprocessor 20 determines if more than one track of data was being accessed. Conventionally data is organized in hard disks in tracks, with a plurality of sectors contained in each track. Because data requests are often quite long, they can be many tracks in length and therefore it is necessary to determine if more than one track is being accessed. Additionally, as only a single error is returned with the initial request, it is also necessary to determine the actual erroneous or bad sector or sectors. If there is more than one track in the request, control proceeds to step 106 where the ending sector value is indicated to be the number of sectors per track. If this is not the case, control transfers to step 108, where the ending sector value is indicated to be the starting sector value plus the count of sectors to be transferred minus 1. Control proceeds from steps 106 or 108 to step 110, where the REMAP_TRACK sequence 200 is called (FIG. 3A). The REMAP_TRACK sequence 200 is a sequence used to perform more detailed portions of the remapping process.

After the REMAP_TRACK sequence 200 has completed, control proceeds from step 110 to step 112. If an error in the REMAP_TRACK operation has been indicated, control proceeds to step 114 where an error flag is set. If no errors have occurred or after the flag has been set, control proceeds to step 116 to determine if at least one track is still remaining. If so, control proceeds to step 118 where the count value is changed by subtracting the number of sectors per track and the sector start value and adding one. In this way the remaining sector count is reduced. Control proceeds to step 120 for an increase in a buffer index pointer, which is developed by adding the number of sectors per track, subtracting the sector starting location and adding one. This value is then used as an index in a data transfer buffer to access past the previous values. Control then transfers to step 122, where the sector start value is set to 1. This is appropriate because after the first sector all operations start from the first sector in a given track.

Control then transfers to step 124 where a determination is made whether the count value is greater than the number of sectors per track. If so, the end value is set equal to the number of sectors per track in step 126. If not, the end value is set equal to the count value in step 128. Control proceeds from step 126 or 128 to step 130, where the head and/or cylinder value is incremented, when appropriate. Control proceeds from step 130 to step 110 and the next track is remapped.

Figure 2B:
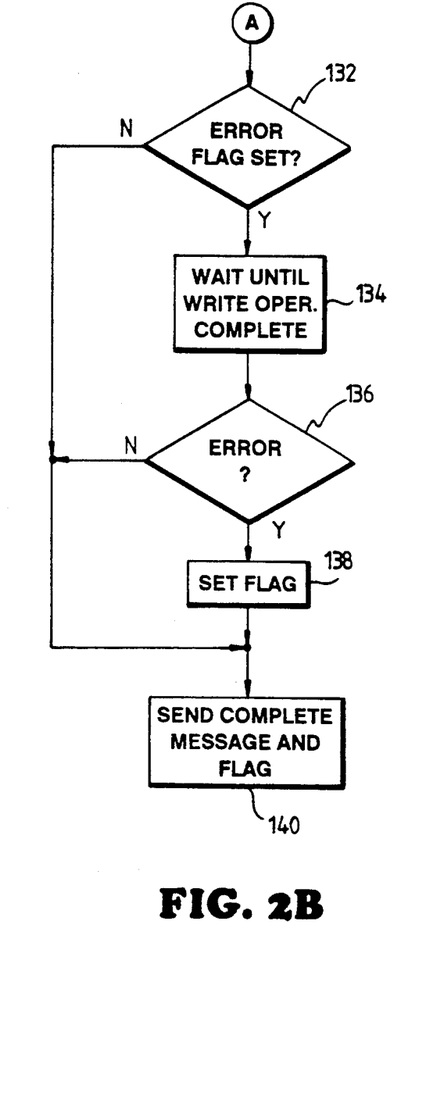

If there were no tracks remaining in step 116, control transfers to step 132 (FIG. 2B). In step 132 the microprocessor 20 determines if an error flag has been set during the preceding operations. If so, control proceeds to 134 to wait until any write operations have actually been completed. This step is needed because in the preferred embodiment the operating system of the disk controller D is a multitasking operating system so that once a separate task is initiated, the current task continues running. Thus handshakes and messages must be passed to allow positive affirmation that a given task has been completed before the next commences. In the preferred embodiment the actual disk request operations, reads or writes, are passed as separate tasks from the various sequences to allow optimization and scheduling, so this handshake procedure is utilized. Control proceeds from step 134 to step 136 to determine if an error occurred in the write process. If so, control proceeds to 138 where an error flag is set. If an error flag was not set in step 132 or in step 136, control proceeds to step 140, which is also where control proceeds from step 138. In step 140 a complete message is sent to the task controller of the disk controller operating system and the error flag value is transferred to indicate if any errors have occurred. Thus, this is the highest level of control remap operations.

The REMAP_TRACK sequence 200 (FIG. 3A) commences at step 202 where a variable referred to as REQUEST_SECTOR is set to one. This variable is used to indicate the desired sector in the track on which operations are to be performed. Control proceeds to step 204, where a single sector read request data structure is developed for transmission to the disk operation tasks. Control proceeds to step 206 where the sector indicated in this data structure is read by the requesting task operation and the data provided to a buffer and an error flag set if appropriate. Control proceeds to step 208 after task completion where a determination is made as to whether a read error occurred and whether the sector which was being read was included in the scope of the request from the REMAP sequence 100 and thus is considered to be a valid sector. As the requests are of a variable length, the requests need not start at the first sector of a track or end at the last sector as indicated by the start sector and end values. In the preferred embodiment this location in or out of a sector request results in different treatment of bad sectors, but uniform treatment could be performed if desired, removing the need for the valid sector decisions.

If there was an error and it is a valid sector, control proceeds to step 210 where the bad sector found flag is set. Control then proceeds to step 212 where a reallocation flag or value is placed in an interleave table at the sector location. The disk unit U utilizes a table of values referred to as the interleave table to indicate various parameters when doing reformat operations, such as actual sector ordering and sector status, such as remapped, bad or normal. The data area of sectors which are remapped in the preferred embodiment include information indicating where the remapped sector is physically located so that the data can be retrieved or stored. Control proceeds from step 212 to step 214.

Figure 3B:
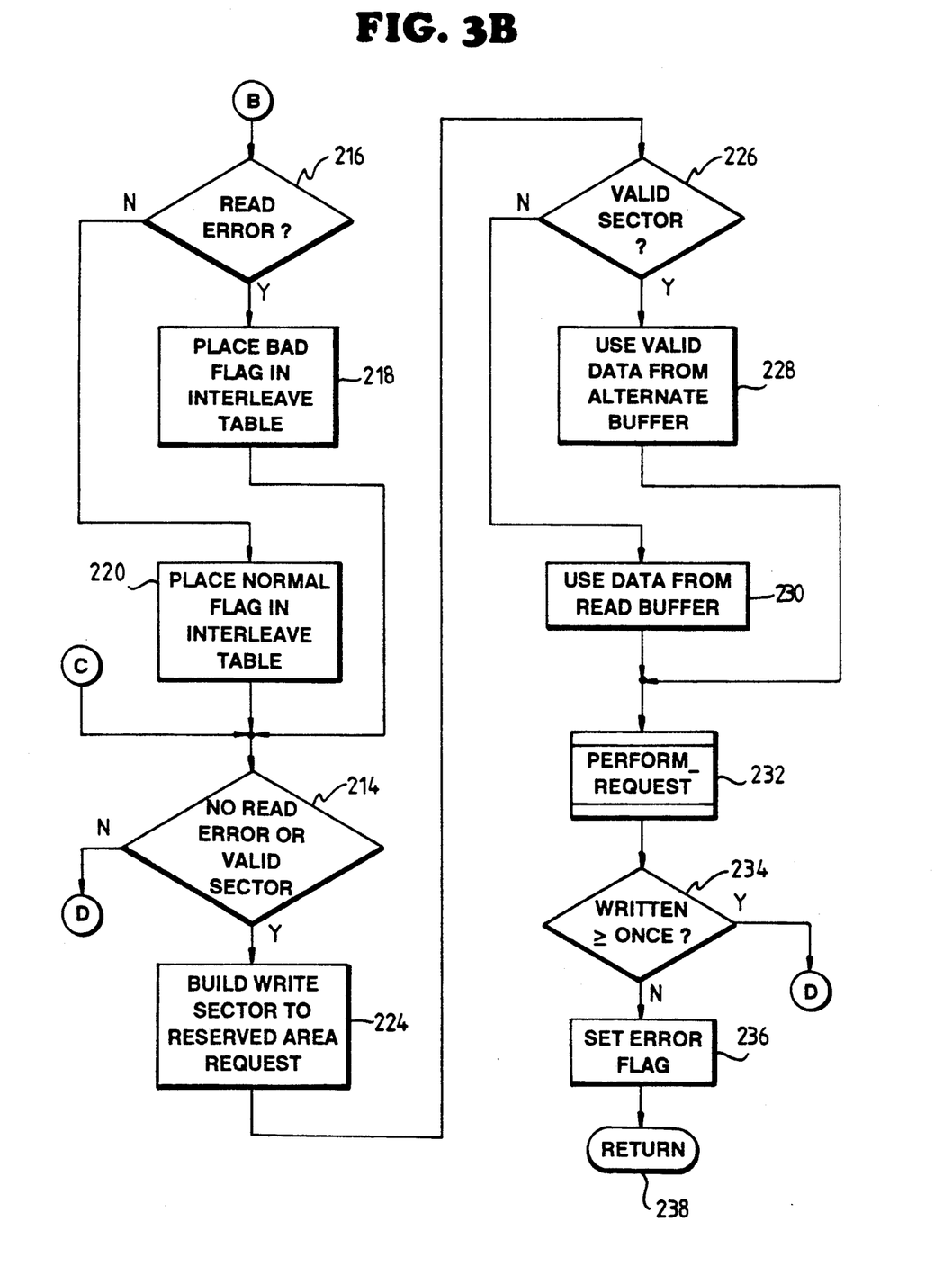

If the determination of step 208 is that no read error occurred or an error occurred outside the valid sector range, control proceeds to step 214 (FIG. 3B) where a determination is made as to whether just a read error occurred. If so, control proceeds to step 218, where the bad flag value is placed in the interleave table. If a read error did not occur, control proceeds to step 220 where a normal value flag is placed in the interleave table. Control proceeds from step 218 or step 220 to step 214.

Figure 3C:
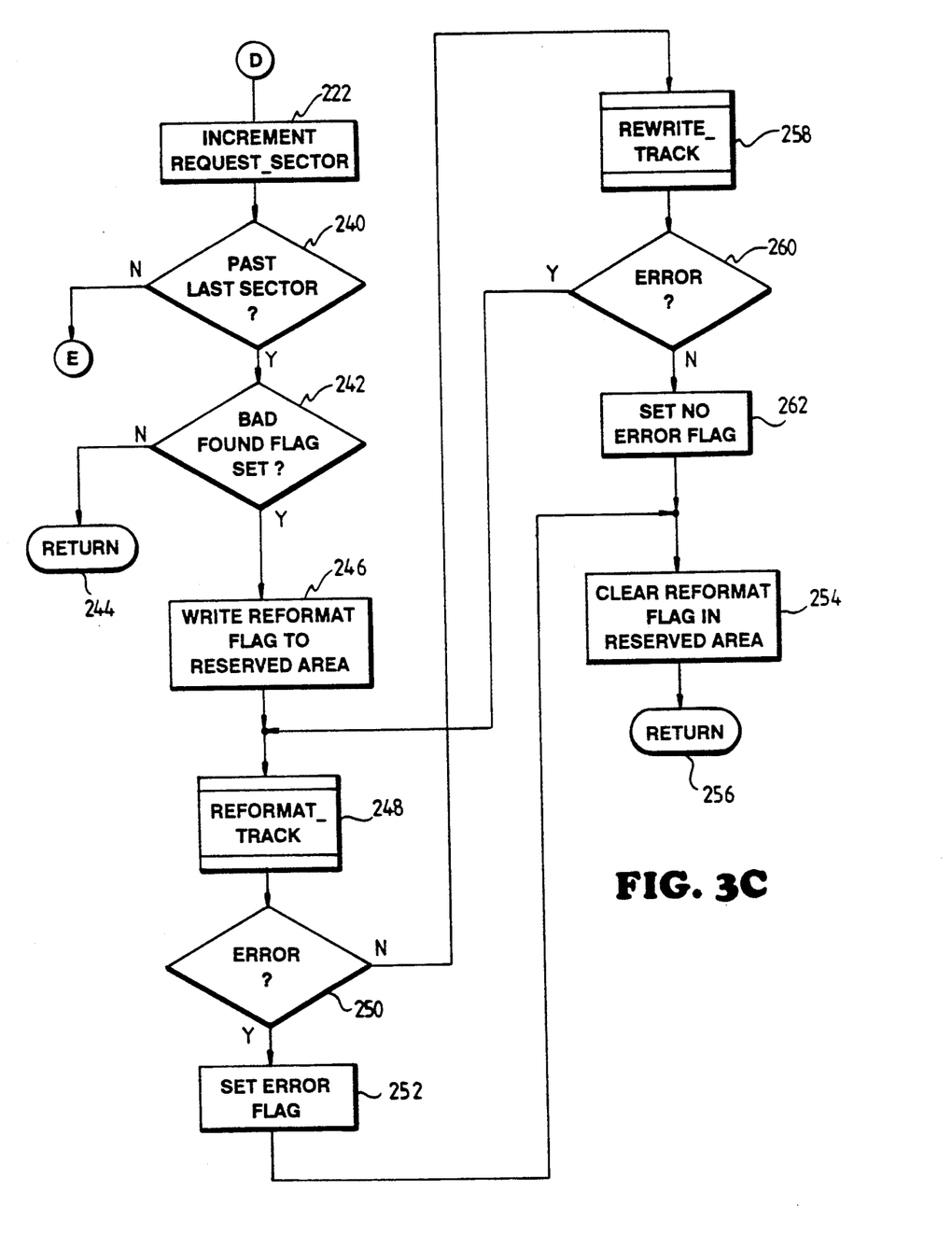

In the step 214 the microprocessor 20 checks to see if there was no read error or if a valid sector was being read. If not, control proceeds to step 222 (FIG. 3C). If so, control proceeds to step 224 where a structure to write a sector to the reserved area which is present on the disk unit U is developed. Each disk unit U preferably contains a special reserved area to allow system information relating to system configuration, disk configuration, disk status and other necessary values to be stored without danger of being overwritten by user data. Control proceeds from step 224 to step 226 to determine if a valid sector had been read. If so, then valid data is obtained from a alternate buffer in step 228. This alternate buffer is automatically loaded by the disk operations tasks in the disk controller D based on the receipt of an error during a read operation and mirroring or parity operation. When an error occurs for a given sector, the correct data is obtained either by reading a mirror drive or developing it from the parity information and is provided to an alternate buffer location. In this way the data is always available and in this case the data is obtained from this alternate buffer for proper storage. In write operations the alternate buffer contains the data provided by the computer system which is to be written to the disk unit U. If it is not a valid sector, data from the normal read buffer is utilized in step 230. This is possible because this branch is accessed only on a no read error case and therefore the data is valid from the normal location. From steps 228 or 230 control proceeds to step 232, where the PERFORM_REQUEST sequence 500 (FIG. 6) is executed to write the sector information to all of the available disk units U which have sufficient space in the reserved area. The operations of the PERFORM_REQUEST sequence 500 will be described in more detail. Control proceeds from step 232 to step 234, where a determination is made if the sector data was written to at least one disk unit. If not, control proceeds to step 236, where an error flag is set. Control then proceeds to step 238, which is a return to the calling sequence, the REMAP sequence 100, with an error indicating that remapping did not occur.

If the data was written at least one time as indicated in step 234, control proceeds to step 222. In step 222 the requested sector value is incremented and control proceeds to step 240. In step 240 the determination is made as to whether all sectors have been obtained. If not, control returns to step 204 and the operation is repeated. Thus, in this manner the proper data for all sectors is obtained and the data stored on the various disk units U. If the last sector has been read, then control proceeds from step 240 to step 242 to determine if the bad sector found flag has been set. If not, this is an indication that the entire track was good and so control returns to the calling sequence in step 244. If a bad sector had been found, control proceeds to step 246 where a flag indicating that a reformatting operation is in progress is written to the reserved areas of all the disk units U so that should power be removed from disk controller D during the following operations the data is not unavoidably lost and the reformatting procedure is continued. Control then proceeds to step 248, where the REFORMAT_TRACK sequence 300 is executed to reformat the particular track of interest. It is noted, as will be explained in more detail, that the REFORMAT_TRACK sequence 300 makes sure that the saved data can be read before actually performing the reformatting operation. After returning from the REFORMAT_TRACK sequence 300, control proceeds to step 250 to determine if an error occurred. If so, control proceeds to step 252 where an error flag is set. Control then proceeds to step 254, where the reformat flag in the reserved area is cleared to indicate that the reformatting process is over. Control then proceeds to step 256, which is a return to calling sequence.

If no error was present in step 250, control proceeds to step 258 where the REWRITE_TRACK sequence 400 is executed. The REWRITE_TRACK sequence 400 rewrites the saved data from the reserved area to the newly reformatted track. Control proceeds to step 260 to see if an error occurred during the operation of the REWRITE_TRACK sequence 400. If so, control returns to step 248 and another attempt is made to reformat the track. If no error occurred, control proceeds to step 62, where a no error flag is set. Control then proceeds to steps 254 and 256.

Thus the remap operation writes to the various disk units and reads the data to be transferred and remapped prior to actually removing and reformatting the particular track. If the data can be successfully obtained, the track is reformatted and the data is rewritten to the track.

Figure 4A:
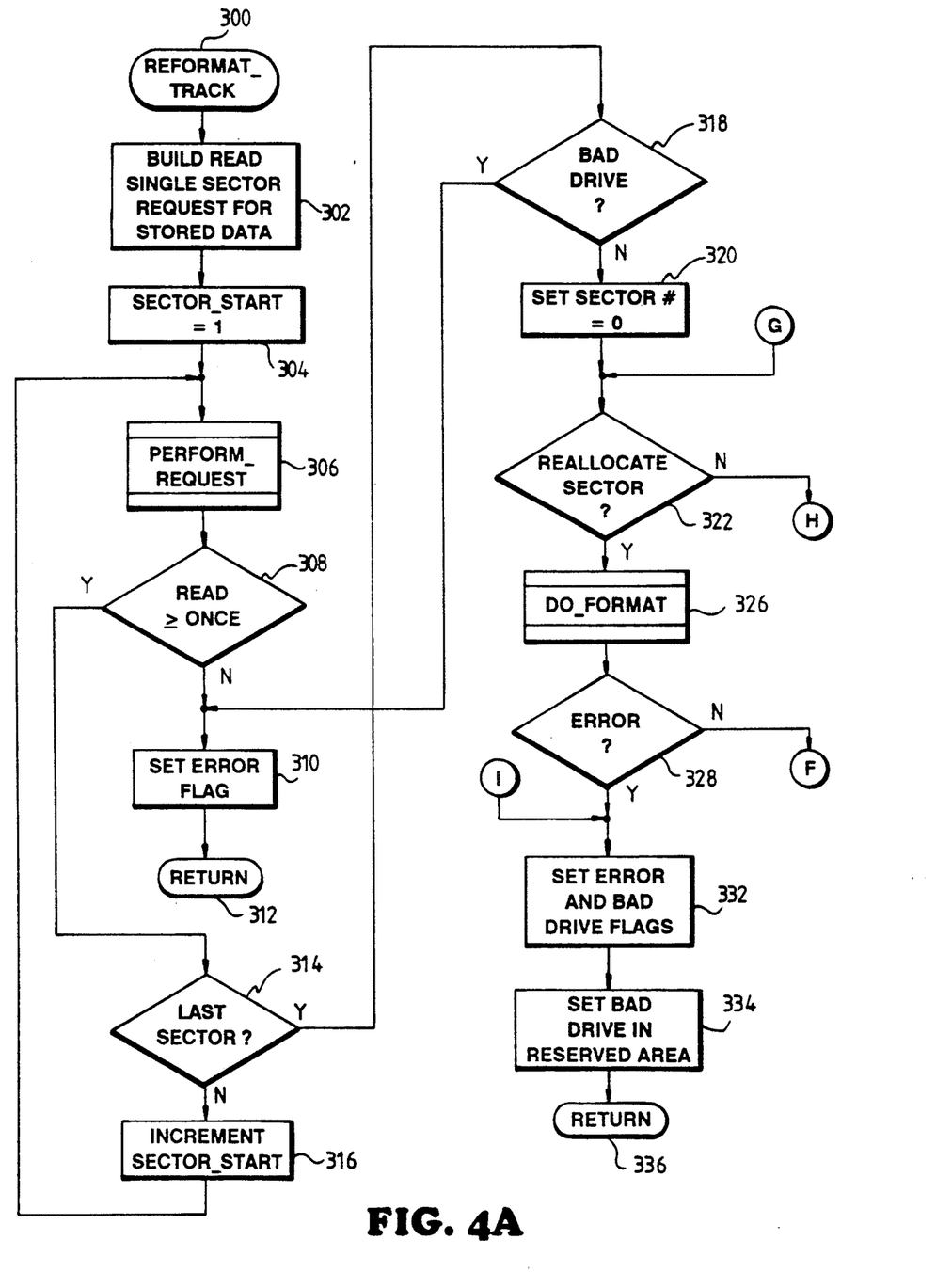

The REFORMAT_TRACK sequence 300 commences at step 302, where a single sector read request for the data temporarily stored in the reserved area is developed. Control proceeds to step 304 where a SECTOR_START value is set to one. Control proceeds to step 306, where the PERFORM_REQUEST sequence 500 is executed to read the data from the various disk units. Control proceeds to step 308 to determine if the data was read at least one time. If not, control proceeds to step 310 where an error flag is set and to step 312, which is a return from the REFORMAT_TRACK sequence 300. If the data has been successfully read as indicated in step 308, control proceeds to step 314 to determine if this was the last sector which had been read. If not, control proceeds to step 316 where the SECTOR_START value is incremented. Control then proceeds to step 306 and the next sector is obtained.

Figure 4B:
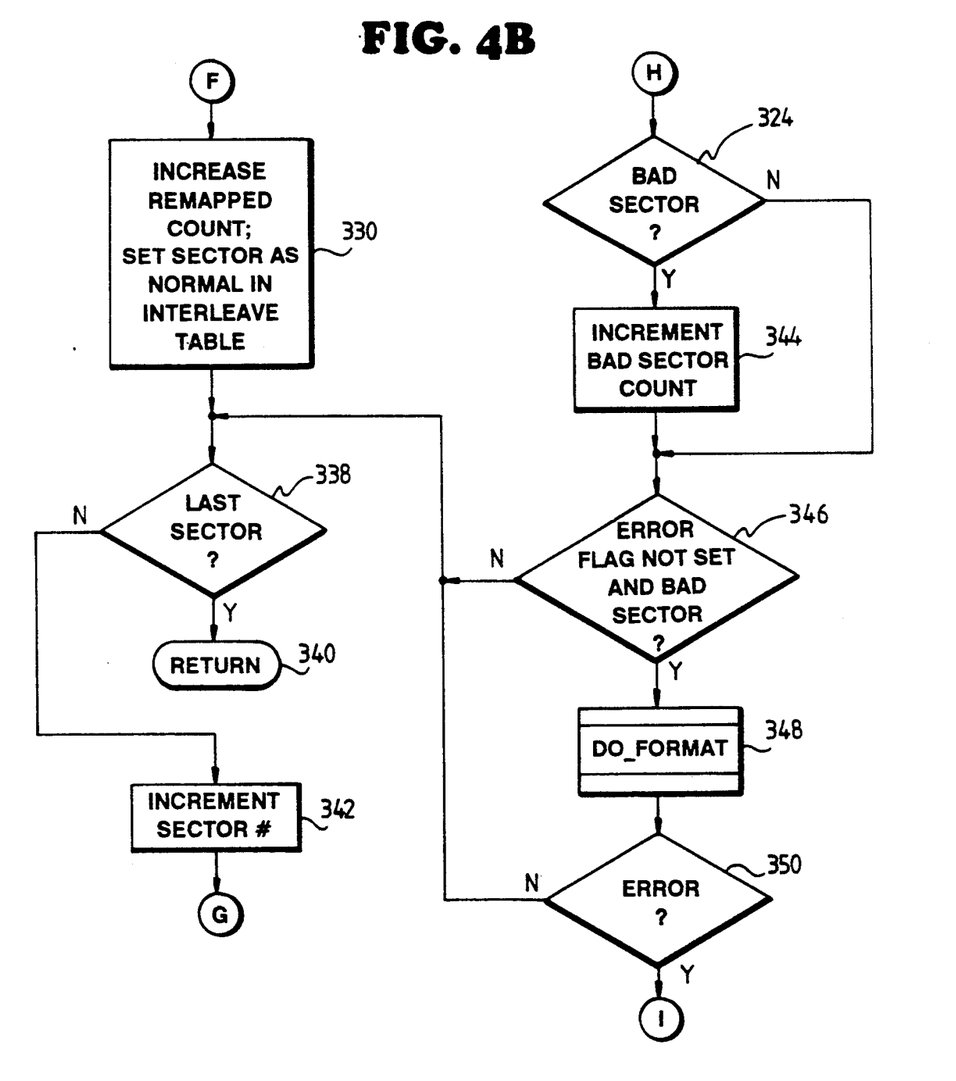

If this was the last sector as indicated in step 314, control proceeds to step 318 to determine if the bad drive value is set for the particular drive, which indicates that this drive is bad. If so, control proceeds to step 310 to set the error flag and to step 312 to return. If it is not a bad drive, control proceeds from step 318 to step 320, where the sector number value is set to 0. Control then proceeds to step 322 to determine if according to the interleave table this sector is to be reallocated. If not, control proceeds to step 324 (FIG. 4B). If it is to be reallocated, control proceeds from step 322 to step 326 where the DO_FORMAT sequence 600 is executed to format the particular track being analyzed. This reformat track command is executed after finding each sector to be reallocated because the disk units U of the preferred embodiment can only reallocate one sector per format command, the first one found in the interleave table. Thus the format operation must be performed for each sector to reallocated. Similarly, separate format track commands must be provided for each bad sector. The disk unit U receives the interleave table and a command that the sector is to be reformatted from the DO_FORMAT sequence 600. The disk unit U then proceeds to change the sectoring of the particular track to match that of the interleave table it just received. When a reallocate indication is present for a particular sector, the disk unit U determines the next closest available sector, preferably in the order of spare sector in the same track, on a different head or on a different cylinder. The new location of the sector data is saved at the original sector location and the disk unit U provides a completion or error indication. Control proceeds to step 328 to determine if an error occurred in the DO_FORMAT sequence 600. If not, control proceeds to step 330. If an error did occur, control proceeds to step 332 where an error flag and a bad drive flag are set. Control then proceeds to step 334 where the bad drive flag is set in the reserved area in the various drive units U. Control then proceeds to step 336 which returns operations to the calling sequence.

If an error did not occur in step 328, control then proceeds to step 330, which increases the number remapped sectors which are present on the disk unit U, and sets the particular sector just formatted to normal status in the interleave table. Control then proceeds to step 338 to determine if this was the last sector. If so, control proceeds to step 340 which is a return to the calling sequence. If this was not the last sector as indicated in step 338, control proceeds to step 342 which increments the sector number value. Control then proceeds to sector 322 and the process is reiterated for the remaining sectors.

If this sector was not to be reallocated as indicated in step 322, control proceeds to step 324. In step 324 a determination is made as to whether this particular sector of interest is a bad sector. If so, control proceeds to step 344 where the bad sector count is incremented. Control proceeds from step 344, or if this was a good sector from step 324, to step 346. In step 346 the microprocessor 20 determines whether the error flag was not set and if this was a bad sectors. If the error flag was not set indicating that no previous formats had failed and this was a bad sector, control proceeds to step 348, where the DO_FORMAT sequence 400 is executed for the single sector. Control proceeds to step 350 to determine if an error occurred. If so, control proceeds to step 332. If an error did not occur, control returns to step 338. Control additionally returns to step 338 from step 346 if the error flag was set or if this was not a bad sector. Thus, the REFORMAT TRACK sequence 300 handles the reformatting of the reallocated or the bad sectors present in a particular track of interest, but only after assuring that the data present on the track can be obtained from the reserved areas where it has been temporarily stored.

Figure 5:
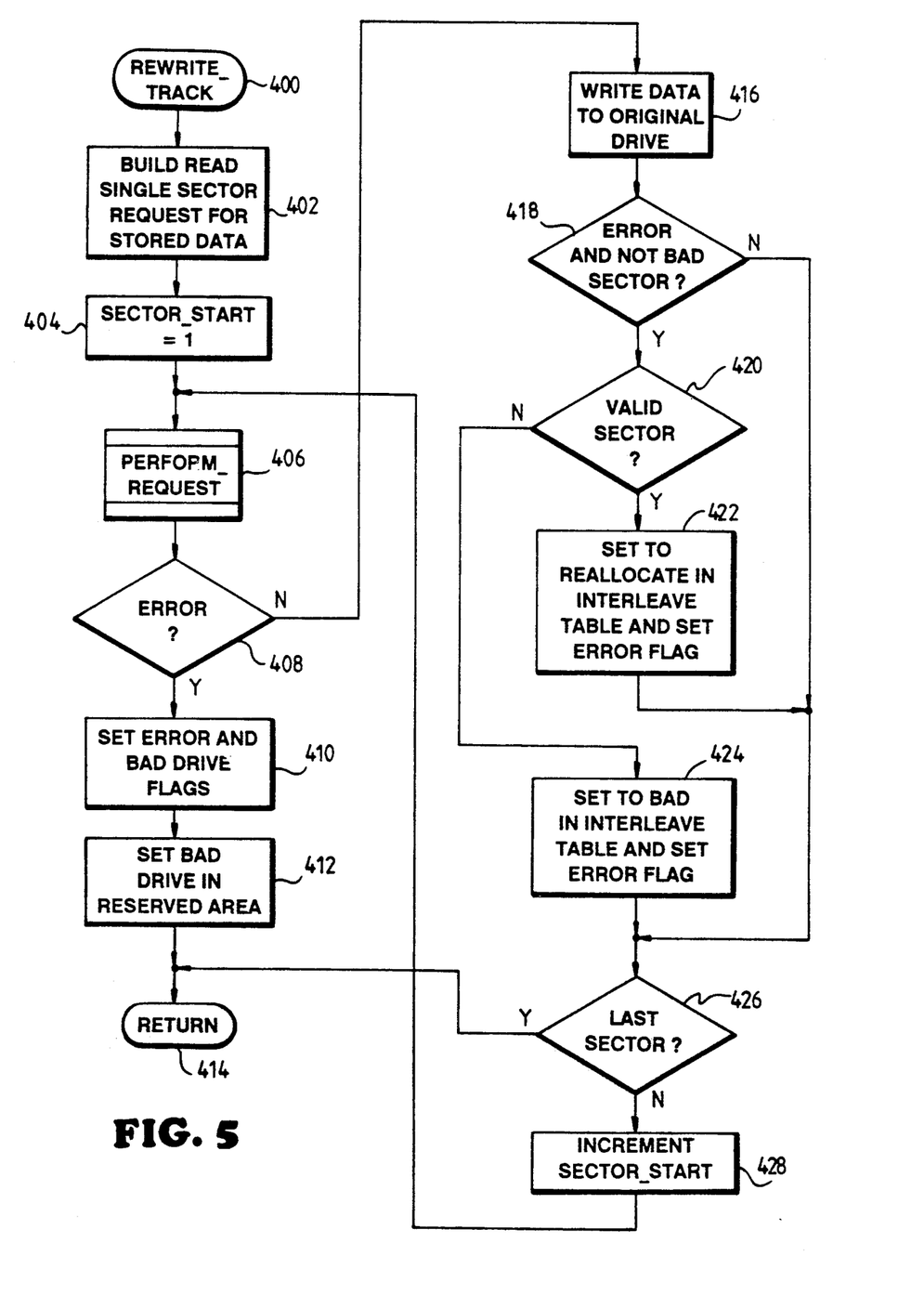

The REWRITE_TRACK sequence 400 commences at step 402 where a single sector read request for the data in the reserved area is developed. Control proceeds to step 404 where the SECTOR_START value is set to one. Control proceeds to step 406 where the PERFOR- M_REQUEST sequence 500 is executed to read the temporarily stored track data from the reserved area. Control proceeds to step 408 to determine if an error occurred. If so, control proceeds to step 410 where the error flag and bad drive flags are set. Control proceeds to step 412 to set the bad drive flag in the reserved area of the disk units U for future reference. Control proceeds to step 414 which is a return to the calling sequence.

If an error did not occur in step 408, control proceeds to step 416 where the obtained data is written to the proper sector on the original track and drive. In this manner the temporarily stored data is rewritten back to the track from which it was obtained to restore the disk unit to full operation. Control proceeds to step 418 to determine if an error occurred and the present sector was indicated as not being a bad sector. If this is true, control proceeds to step 420 to determine if this is a valid sector, that is one within the desired operating range of the request. If so, control proceeds to step 422 where the particular location in the interleave table is set to reallocate and the error flag is set. If this was not a valid sector as determined in step 420, control proceeds to step 424 where the location in the interleave table is set to indicate a bad sector and the error flag is set. Control proceeds from steps 418, 422 or 424 to step 426, where a determination is made as to whether this is the last sector to be rewritten. If so, control returns to step 414. If not, control proceeds to step 428 where the SECTOR_START value is incremented. Control then proceeds to step 406 to read and write the data for next sector.

Figure 6:
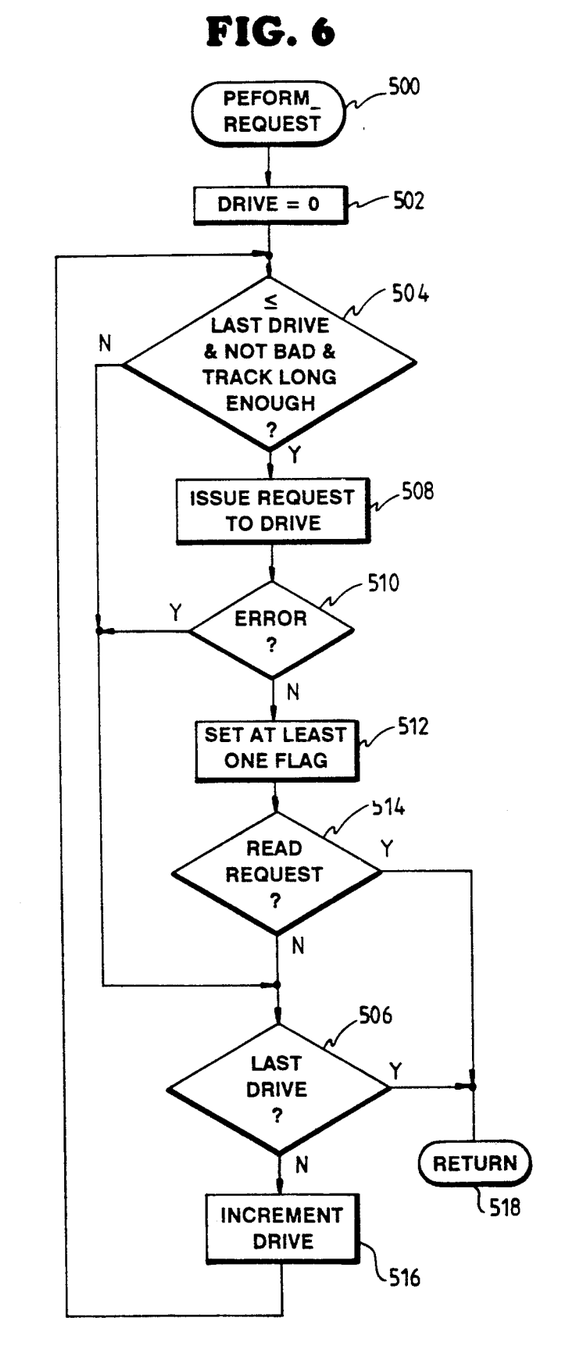

The PERFORM_REQUEST sequence 500 is initiated at step 502 by setting a drive value equal to 0. This is done because the request, either read or write, will be attempted to each physical drive in the array of the preferred embodiment so that the data is stored or obtained from at least one location. Control proceeds from step 502 to step 504, where a determination is made as to whether the current drive value is less than or equal to the last drive, the particular drive is not bad and the tracks contained on that drive are sufficiently long to contain a track from the drive whose track is being remapped. If any of these conditions are not true, control proceeds to step 506. If they are all true, then control proceeds to step 508, where the request, either a read or a write as indicated by the calling sequence, is issued and the operation performed. Control proceeds to step 510 to determine if an error occurred in the drive operation request. If not, then control proceeds to step 512 where the at least once performed flag is set to indicate that either the data has been written at least one time or is it has been read at least one time. Control then proceeds to step 514 to determine if the operation had been a read request. If so, control proceeds to step 518, a return to the calling sequence because the data has been successfully obtained from a drive and that is all that is necessary. If it was not a read request in step 514 or if an error did occur in step 510, control proceeds to step 506 to determine if this was the last disk unit or drive. If so, control proceeds to step 518. If not, control proceeds to step 516 where the drive value is incremented. Control then proceeds to step 504 for an attempt on the next disk unit U.

Figure 7:
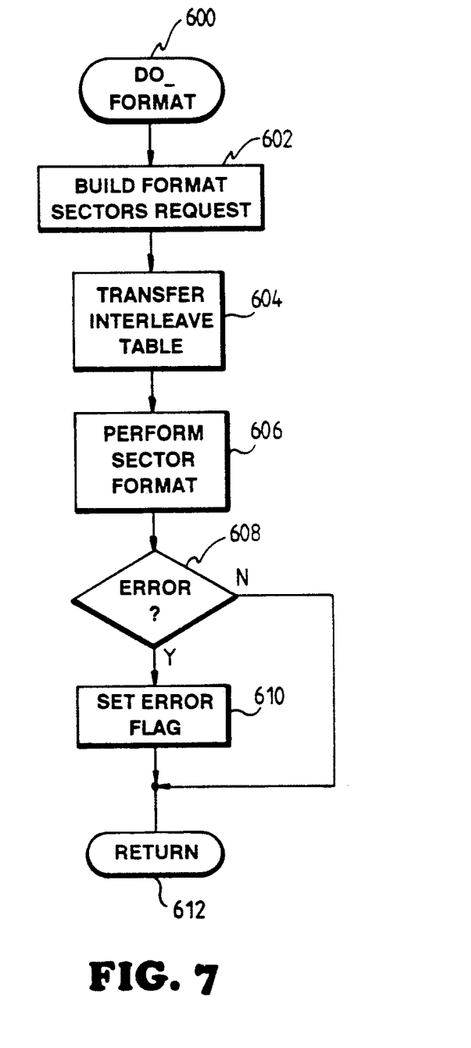

The DO_FORMAT sequence 600 initiates at step 602 where a format request for the requested number of sectors of the indicated track of a particular drive or disk unit U is developed. Control proceeds to step 604 where the interleave table is transferred from its temporarily buffer location as utilized in the previous sequences to the location actually utilized by the drive units U when the transfer request is developed. Control proceeds to step 606 where the sector format operation is requested and performed by the disk unit U. Control proceeds to step 608 to determine if an error occurred in the formatting process. If so, control proceeds to step 610 where an error flag is set. If an error did not occur or after completion of step 610, control proceeds to step 612, which is a return from the DO_FORMAT sequence 600.

Figure 8:
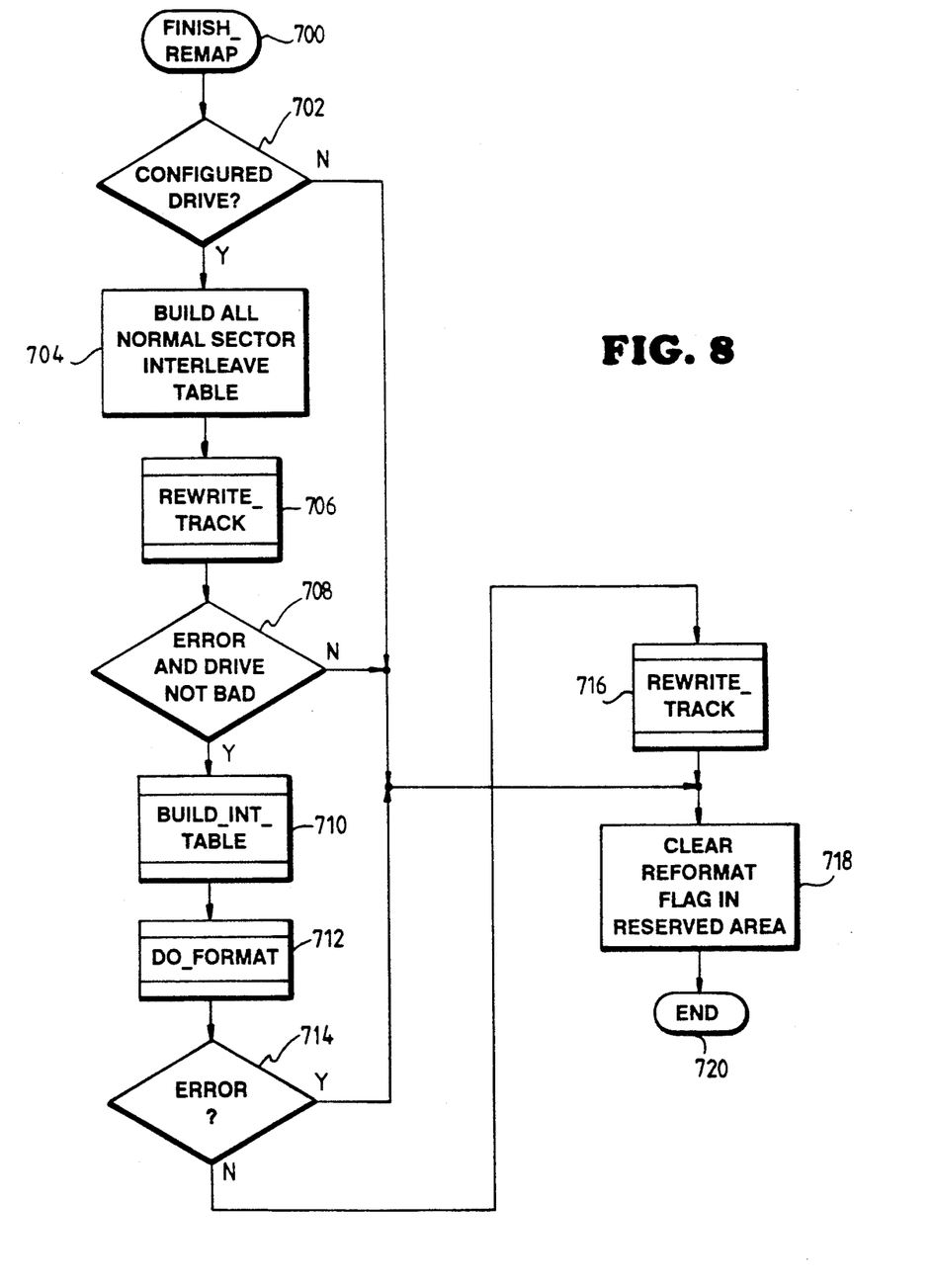

As mentioned previously it is possible that the system power could be removed during the reformatting operation and therefore the data would be lost if this the remapping process was not continued. Upon initiation and power up of the disk controller D, the remap flag in the reserved area of the disk units U is checked by the initialization or restarting sequence to determine if a remap was in process. If so, the FINISH_REMAP sequence 700 (FIG. 8) is initiated to complete the remapping. Control commences at step 702 where the determination is made as to whether the particular drive has been configured. If this is a configured drive, that is a drive that has been utilized previously, control proceeds to step 704 where an interleave table containing all normal sectors is developed. Control proceeds to step 706 which is a request for the REWRITE_TRACK sequence 400 to rewrite the saved data back to the track of interest on the disk unit U. This is done in case the format operation C had already completed when power was interrupted. Control proceeds to step 708 to determine if an error had occurred and the drive was not bad. If this case is true, then control proceeds to step 710 where the BUILD_INT_TABLE sequence 800 is executed. This BUILD_INT_TABLE sequence 800 develops a proper interleave table as it is apparent that the all normal sector interleave table is inappropriate. Control then proceeds to step 712 where the DO_FORMAT sequence 600 is executed to reformat all the bad sectors in the track. Control proceeds to step 714 to see if an error occurred in the formatting sequence. If not, control proceeds to step 716 where the REWRITE_TRACK sequence 400 is again executed. If the drive was not configured in step 702, there was no error or the drive was bad in step 708 or an error occurred in step 714, and after operations in step 716, control proceeds to step 718 where the reformat or remap flag in the reserved area of the various disk units U is cleared to indicate that the reformatting operation has been completed. Control then proceeds to step 720 which is the end of the FINISH_REMAP sequence 700.

Figure 9:
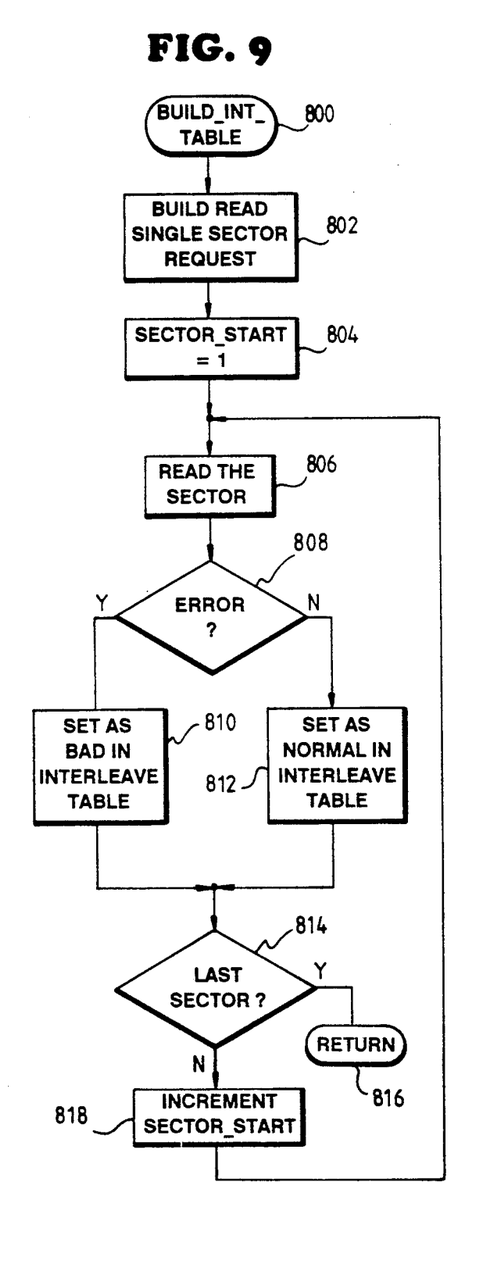

The BUILD_INT_TABLE sequence 800 commences at step 802 where a read single sector request is developed. Control proceeds to sector 804 where the SECTOR_START value is set to one. Control then proceeds to sector 806 where the particular sector of interest is read. Control proceeds to step 808 where an evaluation is made as to whether an error occurred in reading this sector. If so, control proceeds to step 810, where the appropriate sector value is set as bad in the interleave table which is being developed. If no error occurred, control proceeds to step 812 where a normal value is placed in the interleave table under development. From steps 810 or 812 control proceeds to step 814 to determine if the last sector had been obtained. If so, control proceeds to step 816 which is a return to the calling sequence. If the last sector had not been obtained control proceeds to step 818 where the SECTOR_START value is incremented. Control then proceeds to step 806 and looping continues until all of the sectors have been obtained and the full interleave table has been built.

The foregoing disclosure and description of the invention are illustrative and explanatory thereof, and various changes in the size, shape, materials, components, circuit elements, wiring connections and contacts, as well as in the details of the illustrated circuitry and construction and the method of operation may be made without departing from the spirit of the invention.

We claim:

1. A method for automatically correcting errors on a disk unit included as one of a series of disk units in a computer system while the computer system continues to execute a main program unrelated to disk error correction, the computer system providing data operation requests and the disk unit providing error indications on failed request, the disk unit being organized in tracks, with each track having a series of sectors, the method comprising:
   detecting the data operation request error; and
   automatically executing a disk track remapping process without user intervention if the operation request was a write request or if the operation request was a read request and data recovery is possible, the disk track remapping process comprising:
   determining a bad sector forming a basis for the failed request;
   obtaining valid data for each sector on the track containing said bad sector;
   temporarily saving said obtained data;
   remapping the sectors on said track containing said bad sector to remove said bad sector from use; and
   restoring said temporarily saved data to said track containing said bad sector.

2. The method of claim 1, wherein remapping includes reading said temporarily saved data prior to reformatting said track and reformatting said track to remove said bad sector from use only if said data read is successful.

3. The method of claim 1, wherein restoring includes reading said temporarily saved data and writing said read data to said original track in repetitive, single sector operations until the entire track is complete.

4. The method of claim 1, wherein determining a bad sector includes reading each sector contained in the data operation request one sector at a time.

5. A method for automatically correcting errors on a disk unit included as one of a series of disk units in a computer system, the computer system providing data operation requests and the disk unit providing error indications on failed requests, the disk unit being organized int racks, with each track having a series of sectors, the method comprising:
   detecting ht data operation request error; and
   executing a disk track remapping process if the operation request wa s write request or if the operation request was a read request and data recovery is possible, the disk track remapping process comprising:
   determining a bad sector forming a basis for the failed request;
   obtaining valid data for each sector on the track containing said bad sector;
   temporarily saving said obtained data;
   setting a remap in progress flag in an area of each of the disk units;
   remapping the sectors on said tack containing said bad sector to remove said bad sector from use after said remap in progress flag is set;
   restoring said temporarily saved data to said track containing said bad sector; and
   clearing said remap in progress flag after restoring said data to said track.

6. The method of claim 5, wherein said method further comprises,
   initiating a remap completion process if said remap in progress flag is set on resetting of the computer system, the remap completion process comprising:
   indicating that all sectors of said track are useable;
   attempting to restore said temporarily saved data to said track containing said bad sector;
   developing sector status information of said track if said restoration attempt fails;
   reformatting said track utilizing said developed sector stats information; and
   restoring said temporarily saved data to said track.

7. A method for automatically correcting errors on a disk unit included as one of a series of disk units in a computer system, the computer system providing data operation reuses and the disk unit providing error indications on failed requests, the disk unit being organized in tracks, with each track having a series of sectors, the method comparing:
   detecting the data operation request error; and
   executing a disk track remapping process if the operation request was a write request or if the operation request was a read request and data recovery is possible, the disk track remapping process comprising:
   determining a bad sector forming a basis for the failed request;
   obtaining valid data for each sector n the track containing said bad sector;
   temporarily saving said obtained data, wherein temporarily saving said data includes writing said data to reserved areas on a plurality of disk units capable of receiving the entire track of data;
   remapping the sectors on said track containing said bad sector to remove said bad sector from use; and
   restoring said temporarily saved data to said track containing said bad sector.

8. The method of claim 7, wherein restoring said temporarily saved data includes reading said data form successive disk units until a successful full track read operation has occurred.

* * * * *

UNITED STATES PATENT AND TRADEMARK OFFICE
CERTIFICATE OF CORRECTION

PATENT NO. : 5,166,936
DATED : November 24, 1992
INVENTOR(S) : Richard A. Ewert, Stephen M. Schultz It is certified that error appears in the above-identified patent and that said Letters Patent is hereby corrected as shown below:

In Col. 11, Line 60, please replace "int racks" with --in tracks--.

In Col. 11, Line 62, please replace "ht" with --the--.

In Col. 12, Line 2, please replace "wa s" with --was--.

In Col. 12, Line 36, please replace "reuses" with --requests--.

In Col. 12, Line 39, please replace "comparing" with --comprising--.

In Col. 12, Line 48, please replace "n" with --on--.

In Col. 12, Line 59, please replace "form" with --from--.

Signed and Sealed this

Nineteenth Day of October, 1993

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,166,936
DATED : November 24, 1992
INVENTOR(S) : Richard A. Ewert et al.

It is certified that error appears in the above-identified patent and that said Letters Patent is hereby corrected as shown below:

Column 11,
Line 23, delete "request" and insert -- requests --.

Column 12,
Line 2, delete "wa s" and insert -- was a --.
Line 31, delete "stats" and insert -- status --.

Signed and Sealed this

Twenty-fourth Day of January, 2006

JON W. DUDAS
*Director of the United States Patent and Trademark Office*